(12) United States Patent
Lynen et al.

(10) Patent No.: US 10,937,249 B2
(45) Date of Patent: Mar. 2, 2021

(54) SYSTEMS AND METHODS FOR ANCHORING VIRTUAL OBJECTS TO PHYSICAL LOCATIONS

(71) Applicant: Google LLC, Mountain View, CA (US)

(72) Inventors: Simon Lynen, Zurich (CH); Eric Thomas Andresen, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/405,090

(22) Filed: May 7, 2019

(65) Prior Publication Data

US 2019/0340836 A1 Nov. 7, 2019

Related U.S. Application Data

(60) Provisional application No. 62/668,205, filed on May 7, 2018.

(51) Int. Cl.
| | |
|---|---|
| *G06T 19/00* | (2011.01) |
| *G06T 19/20* | (2011.01) |
| *G06T 7/73* | (2017.01) |
| *H04W 12/08* | (2021.01) |

(52) U.S. Cl.
CPC ............ *G06T 19/20* (2013.01); *G06T 7/75* (2017.01); *H04W 12/08* (2013.01)

(58) Field of Classification Search
CPC ........... G06T 19/20; G06T 7/75; H04W 12/08
See application file for complete search history.

(56) References Cited

U.S. PATENT DOCUMENTS

| | | | | |
|---|---|---|---|---|
| 8,922,590 B1 * | 12/2014 | Luckett, Jr. | ............. | G06F 3/011 |
| | | | | 345/633 |
| 9,754,397 B1 | 9/2017 | Piemonte et al. | | |
| 10,339,721 B1 * | 7/2019 | Dascola | ................ | G06F 1/1694 |
| 10,373,381 B2 * | 8/2019 | Nuernberger | ............ | G06F 3/011 |
| 10,438,414 B2 * | 10/2019 | Bennett | .................... | G06T 19/20 |
| 2002/0184457 A1 * | 12/2002 | Yuasa | .................. | G11B 27/002 |
| | | | | 711/161 |
| 2010/0235240 A1 * | 9/2010 | Park | ..................... | G06Q 20/123 |
| | | | | 705/14.61 |

(Continued)

OTHER PUBLICATIONS

International Search Report and Written Opinion for Application No. PCT/US2019/031152, dated Sep. 25, 2019, 20 pages.

(Continued)

*Primary Examiner* — Martin Mushambo
(74) *Attorney, Agent, or Firm* — Dority & Manning, PA (57) ABSTRACT

The present disclosure provides systems and methods that allow a first user to anchor a virtual object to a physical location and a second user to view the virtual object at the physical location. In particular, aspects of the present disclosure are directed to workflows, application programming interfaces ("APIs"), and computing system infrastructure that enable a first computing device to generate an ad hoc mapping of its physical surroundings (e.g., based on sensor data collected by the first device) and to position and anchor a virtual object at a physical location within such mapping. Data descriptive of the mapping and virtual object can be stored in a cloud database and can then be used by or for a second device to render the virtual object at the location of the anchor.

20 Claims, 4 Drawing Sheets

(56) References Cited

U.S. PATENT DOCUMENTS

| | | | | |
|---|---|---|---|---|
| 2012/0023253 | A1* | 1/2012 | Rhyu | H04L 65/4069 |
| | | | | 709/231 |
| 2012/0249741 | A1* | 10/2012 | Maciocci | G06F 3/017 |
| | | | | 348/46 |
| 2014/0337454 | A1* | 11/2014 | Yamamoto | H04L 67/34 |
| | | | | 709/208 |
| 2017/0228412 | A1* | 8/2017 | Agarwal | G06F 16/125 |
| 2017/0345167 | A1* | 11/2017 | Ard | G06T 15/20 |
| 2018/0005443 | A1* | 1/2018 | Poulos | G06F 3/017 |
| 2018/0091305 | A1* | 3/2018 | Wu | G06F 21/36 |
| 2018/0293771 | A1* | 10/2018 | Piemonte | G06T 11/60 |

OTHER PUBLICATIONS

Invitation to Pay Additional Fees for Application No. PCT/US2019/031152, dated Jul. 30, 2019, 14 pages.
International Preliminary Report on Patentability for Application No. PCT/US2019/031152, dated Nov. 19, 2020, 14 pages.

\* cited by examiner

SYSTEMS AND METHODS FOR ANCHORING VIRTUAL OBJECTS TO PHYSICAL LOCATIONS

RELATED APPLICATIONS

This application claims priority to and the benefit of U.S. Provisional Patent Application No. 62/668,205, filed May 7, 2018. U.S. Provisional Patent Application No. 62/668,205 is hereby incorporated by reference in its entirety.

FIELD

The present disclosure relates generally to augmented or virtual reality. More particularly, the present disclosure relates to systems and methods that enable users to anchor virtual objects to physical locations.

BACKGROUND

Virtual reality can refer to a computer-generated environment that simulates experience through senses and perception. Augmented reality can refer to a live view of a physical, real-world environment that has been "augmented" with computer-added perceptual information which can be referred to as virtual objects. For example, the computer-added virtual objects can include information designed to be experienced through one or more sensory modalities such as, for example, the visual, auditory, haptic, somatosensory, and/or olfactory senses.

While some virtual or augmented reality systems do provide a level of shared experience across multiple users, these systems typically rely upon a top-down model of virtual environment generation and deployment. This top-down model does not permit users to generate and anchor virtual objects within the physical world. Nor does such model allow large-scale sharing of user-anchored virtual objects for efficient rendering across multiple additional devices.

SUMMARY

Aspects and advantages of embodiments of the present disclosure will be set forth in part in the following description, or can be learned from the description, or can be learned through practice of the embodiments.

One example aspect is directed to one or more server computing devices that are configured to perform operations. The operations include receiving, from a first computing device, data descriptive of a surrounding environment of the first computing device and data descriptive of a pose of an anchor within the surrounding environment of the first computing device, wherein a virtual object is associated with the anchor. The operations include storing the data descriptive of the pose of the anchor in a data storage device. The operations include receiving a request for the pose of the anchor from a second computing device. The operations include providing, to the second computing device, data descriptive of the pose of the anchor relative to a pose of the second computing device.

Another example aspect is directed to a computing device configured to perform operations. The operations include collecting sensor data descriptive of a surrounding environment of the computing device. The operations include receiving a request from a user to generate an anchor for a virtual object within the surrounding environment of the computing device. The operations include providing, to a server computing system via an application programming interface, data descriptive of the surrounding environment of the computing device and data descriptive of a pose of the anchor for the virtual object within the surrounding environment of the computing device.

Another example aspect is directed to a computing device configured to perform operations. The operations include receiving, from a server computing system via an application programming interface, data descriptive a pose of an anchor of a virtual object within a surrounding environment of the computing device. The operations include rendering, on a display of the computing device, the virtual object within the surrounding environment of the computing device according to the pose of the anchor.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to systems and methods that allow a first user to anchor a virtual object to a physical location and a second user to view the virtual object at the physical location. In particular, aspects of the present disclosure are directed to workflows, application programming interfaces ("APIs"), and computing system infrastructure that enable a first computing device to generate an ad hoc mapping of its physical surroundings (e.g., based on sensor data collected by the first device) and to position and anchor a virtual object at a physical location within such mapping. Data descriptive of the mapping and virtual object can be stored in a cloud database and can then be used by or for a second device to render the virtual object at the location of the anchor. For example, the rendering by the second device can be based on a second ad hoc mapping of the physical surroundings of the second device (e.g., generated based on sensor data collected by the second device).

More particularly, a central aspect of the present disclosure is the placement and use of "anchors." An anchor can generally refer to a connection defined between the physical and virtual worlds. The use of anchors allows the placement and positioning (e.g., by individual users) of virtual content within the physical world and, subsequently, the rendering of the anchored virtual content upon the physical world at the anchor location.

Thus, an anchor typically corresponds to or includes a pose (e.g., position and orientation) in the real world (e.g., the corner of a particular table). For example, the pose can be expressed within a coordinate frame such as a Cartesian coordinate frame. This pose can be surfaced via a software development kit ("SDK") through the use of APIs in a way that allows users to attach virtual objects to it. For example, the system can allow a user to place virtual objects for instance on the corner of the table.

After the anchor has been placed, it can be stored in a cloud system and can then be served (e.g., via APIs) to additional devices. Thus, when an additional device seeks to have an AR experience at the particular table, the virtual object will re-appear in the exact same location. This is the case even if the application associated with the device that placed the anchor has closed.

In order for this recognition to work, the computing devices may be enabled to describe/understand what the scene around the anchor looks like. Thus, in some implementations, each device can collect sensor data (e.g., images captured by camera(s)) and can memorize or otherwise ascertain the geometry and appearance of the surrounding scene in such a way that the device can be localized relative to the anchors.

Thus, the systems and methods described herein support augmented reality ("AR") and/or virtual reality ("VR") multi-user "sharing" experiences (e.g., where sessions take place at roughly the same time) and/or "persistence" experiences (e.g., multiple sessions by one or more users take place at the same and/or different times) in which virtual objects anchored to the physical world by a first user are made visible to one or more second users present at the location of the anchor. In particular, a cloud infrastructure including cross-platform APIs and SDKs enables a seamless sharing experience across multiple different devices and users.

In some implementations, an anchor generated by a user can be described in a data structure referred to as Frames of Interest ("FOI"). An FOI can describe a pose (e.g., position and orientation) at which a virtual object has been anchored. In some implementations, locations at which one or more virtual objects have been anchored can be referred to as an AR or VR "hotspot."

In some implementations, anchors can be positioned relative to one or more visual features (e.g., descriptor and detector) in the environment. In some implementations, the computing device operated by the user that is placing the anchor (e.g., an application thereof) may need to view anchors from any perspectives they want the anchors to recognized from later. Devices and/or applications can collect visual information actively (e.g., during a mapping step, for example, in which instructions to walk around the AR content location are provided to the user) or passively (e.g., during regular application usage). In some implementations, anchors can also include or have associated therewith an image or video clip to help users identify where the anchor was placed (e.g., which may be especially useful when sharing with other users who will need to find the AR anchor). This additional image collection and storage can also be helpful for developing better visual features.

In some implementations, the FOI describes the pose of the anchor but does not necessarily describe the virtual object itself. Instead, for example, a model of the virtual object can simply be referenced and can be accessed from some other location (e.g., the cloud database, a fixed set of assets included in the application, and/or some other channel). Thus, an AR artifact can be positioned relative to an anchor. AR artifacts can be stored in a first party artifacts index, or they can be managed by third party applications or application backends. Anchors can support all of these use cases and do not necessarily require use of a first party index.

The pose (e.g., position and orientation) of an anchor can be defined according or relative to a mapping of a portion of the physical world. The mapping can be a previously generated global mapping or, according to an aspect of the present disclosure, the mapping can be a localized mapping that is generated based on sensor data collected by a device that seeks to establish the anchoring.

In some implementations, a mapping of a portion of the physical world can be stored and described in a data structured referred to as an Area Description File ("ADF"). The ADF can include a map of the environment which describes the appearance and geometry of a scene in a way that allows AR rendering algorithms to recognize the scene and/or localize a device relative to the scene.

In some implementations, ADFs are not exposed publically. ADFs can be merged with other ADFs and can be augmented with additional data over time. For example, merging two or more ADFs can include combining the data provided by the two or more ADFs into a single file that has a single, shared coordinate frame. In some instances, ADFs can be merged if the environments they describe are at least partially overlapping.

According to one aspect, the present disclosure provides APIs and system infrastructure that support persistent placement of virtual content in the physical world without requiring pre-mapped spaces. In particular, the present disclosure provides computing infrastructure that enables cloud-based storage and serving of information useful to anchor and render virtual objects such as, for example, environment mappings and virtual object descriptions.

As one example, a server computing system can provide a Visual Positioning Service (VPS), which can optionally be provided as a service in "the cloud." The VPS can generate, receive, store, use, and/or serve FOIs that describe anchor poses of virtual objects and ADFs that describe the underlying mapping data. The VPS can manage, merge, optimize, and/or compress the FOIs and/or ADFs. For example, the ADFs can be shared and/or indexed through their corresponding FOIs.

Thus, in some implementations, a computing system (e.g., a VPS provided by a server computing system) can perform management of FOIs. For example, in some implementations, FOIs which should be displayed in the current session can be requested through an API. A user computing device can then load the necessary mapping data for a given FOI from the local disk and/or through VPS (e.g., using tiles or a server-side query) and can render the virtual object within the scene in accordance with the FOI.

According to another aspect, the computing system (e.g., a VPS provided by a server computing system) can enable persisting of FOIs. For example, in some implementations, if an FOI should be persisted, the underlying mapping system can gather the necessary sensor data (e.g., raw and/or processed video data for recognition and/or localization) during FOI creation. Persistent FOIs can be stored in an FOI-store. Below the API, multiple FOIs can reference the same mapping data and the mapping data of multiple FOIs can be merged into a single representation.

In some implementations, the computing system can provide VPS-backed persistence. For example, in some implementations, an FOI and/or ADF can be uploaded to the VPS backend for indexing and processing. Overlapping ADFs can be merged and jointly refined. Improved and/or compressed versions of the mapping data can be downloaded back to the "origin" device, allowing the device to free some of its memory. Once FOIs are persisted to the cloud they can also be shared with other devices for co-presence experiences or other experiences. ADFs which overlap with the global VPS scaffolding can also be registered to the global scaffolding.

In some implementations, in order for multiple sessions (e.g., taking place at the same or different times) to be able to consistently show virtual objects at the same physical location, all involved electronic devices (e.g., user devices such as smartphones, head-mounted displays, etc.) must understand their pose (e.g., position and orientation) with respect to the environment. Thus, the devices much establish or otherwise understand a common frame of reference and know their pose within it. Once such common frame of reference is established and real-time pose estimation is enabled, all devices can render the relevant content in a consistent manner.

In some instances, the co-registration of pose among multiple devices described above can be achieved through the use of external tracking devices, such as are used in motion-capture studios. However, the use of the sophisticated external tracking devices is typically not practical for more widespread, mobile AR/VR systems employed by the average end-user.

In view of this deficiency, the present disclosure provides systems and methods that leverage visual, inertial, and/or other sensory information captured by the device's camera(s), inertial-measurement unit(s) ("IMUs"), and/or other sensors to establish a common frame of reference. In one example workflow, a "hosting device" builds a model of the environment using sensor information and builds a mapping of the environment (e.g., which can take the form of an ADF) which is sent either in raw form or pre-processed to a server computing system (e.g., a VPS of the server system). At the server system, the information is potentially processed further before being used in conjunction with data from a "receiving device" to recognize the visual elements in the environment.

In some implementations, these processing and recognition steps can be performed by the server system (e.g., in which case the receiving device can send sensor data to the server for use in recognition). Alternatively, the processing and recognition steps can be performed by the receiving device (e.g., in which case the server system sends the sensory information from the hosting device to the receiving device for use in processing). In yet further implementations, besides the path involving the server system, alternatively a direct peer-to-peer connection between the devices is possible, where both devices directly exchange visual information to establish a common frame of reference. Here, data processing can be performed by the hosting device and/or the receiving device.

Once a common frame of reference is established through matching of sensor data, the anchor pose (and thus the position of content) is resolvable for both devices and allows consistent rendering of virtual content across both devices. Thus, cloud anchors enable global-scale persistent content placement and discovery.

In particular, in some implementations in which the system is cross-platform, a cloud anchor service API can interface with low-level APIs for different platforms such as Google's ARCore or Apple's ARKit. The system can capture and/or transmit via the APIs motion and visual data at a fixed or variable frequency. This information can involve raw and/or pre-processed sensor information from cameras, IMUs, and/or other sensors. The information is then sent raw and/or preprocessed and/or compressed to the server backend, where the data is further processed and stored. In some implementations, when the receiving device wants to resolve an anchor post it sends visual data to the server or hosting device which then compares this information with the visual map created by the hosting device. Once a match is found, the computed post of the receiving device can be returned. Together with the initially created anchor pose, the desired content can be rendered.

Thus, in some implementations, a receiving computing device (e.g., a user computing device such as a smartphone, head-mounted display, or other rendering device) can perform FOI localization and/or can work with a server or other hosting device to perform FOI localization. For example, in some implementations, for as long as the FOI coordinate system is accessed by an application on the device, the underlying mapping data will be kept in memory and used for localization of FOIs on-device. The localization algorithm can track most accurately the FOI which is closest to the user by switching to the most suitable ADF internally. FOIs which are not actively tracked may drift relative to the camera pose.

For FOIs which are persisted to the cloud, the localization queries can also be processed by the VPS backend. An application can send a visual query to VPS which is used to query all nearby ADFs in a region. Once an ADF is recognized and the device can be localized in it, the FOI (and its transformation) can be made available to the application for content rendering. For example, the server computing system can transform all FOIs into the device's start of service (e.g., initial) frame to simplify the developer workflow. For accurate tracking of FOIs, the system might decide to download mapping data (e.g., tiles) from the server to the device.

In some implementations, established anchors can have a defined lifespan. For example, in some implementations, every item of content placed at an AR-hotspot can have a limited lifetime depending on, for example, richness of sensor-data captured and/or other characteristics. After content expires, it can be automatically deleted from the system. To make content persist for longer, the user may capture more sensor-data/viewpoints/times-of-day/etc. Having an automated expiration date has nice implications for user-expectations and backend infrastructure.

Content can be discovered in a number of different ways. In one example, content discovery can occur by explicit content sharing. For example, in some implementations, users can share content URLs or other indications of content location which contain information about where to find the experience. Once at the right physical location, the VPS server system can recognize the ADFs and resolve the pose of the content relative to the camera for rendering. Beacon devices are one potential option to perform content sharing. For example, a beacon device can tell all users in a specific space about relevant content.

In another example, content discovery can occur by visual recognition. For example, in some implementations, content can be placed publicly; anchored to the scaffolding and/or to it's own hotspot ADF. Users can discover content by using VPS to recognize nearby places in which objects are placed (e.g., a compass-like user interface could provide guidance to experiences). For the ADFs that VPS recognizes, the corresponding FOI poses can be sent to the device. Content, in turn, can be resolved using the available FOIs.

Thus, in one example, starting from approximate location (e.g., GPS), a device can be cloud localized against nearby ADFs, and embedded anchors and their pose can be returned in the device coordinates. The AR index can then use the set of recognized anchors and their locations to retrieve visible content. Anchor metadata can be used by applications to filter (e.g., limit to anchors created by or renderable by the consuming application). Location can also be used to alert users to the presence of nearby AR content if they are not actively using AR.

In one example use, two users with each one device look at a scene. They can be at the same physical scene at the same time or at different times. The first user places an object at a detected plane and presses a "Publish" button in the application. A background process is started (e.g., with progress notification) which transmits recorded scene appearance and FOI data to the VPS system. Once the progress bar hits 100% the content becomes visible to the second user in the same physical space without explicit mapping or sharing steps. In some implementations, controls can be provided that enable the first user to limit visibility of the object to a certain subset of users (e.g., the second user). Alternatively, the user can permit visibility of the object to any and all users.

Example applications that can leverage cloud anchors include entertainment applications (e.g., location-based or multiplayer (especially asynchronous or large user-scale) games, Tilt Brush art installations, etc.); social expression applications (e.g., persistent ornaments (e.g., AR gifting or decorations), graffiti walls, bulletin boards, etc.); information annotation applications (e.g., attach schedules to conference rooms, instructions to Airbnb rentals, etc.); and/or other types of applications.

Thus, in some implementations, the present disclosure provides or leverages the following technical components: A browseable library of assets to place sourcing AR-index; Plane detection and user interface for object placement by a first user; On-device and/or cloud FOI management; Data recording and upload (e.g., in the form of a compressed sensor-stream and/or features, such as, for example, as an mp4-video plus IMU data); VPS map processing (e.g., low latency bundle processing); VPS localizer indexing (e.g., per-sequence fingerprinting and insertion to dynamic index); Query of VPS (e.g., dynamic and static index) to retrieve resolvable FOI of matching ADFs; Retrieval of those FOIs which are locatable through the micro-ADFs or scaffolding; and FOIs that provide pose for content and allow retrieval. The systems described herein provide the first AR SDK which allows sharing and persistence cross platform. The sharing can be performed as an automated (cloud backend) service.

Benefits of using cloud-backed services (e.g., versus pure on-device) include:

Public and asynchronous sharing: cloud-backed anchors can be shared broadly without need for peer-to-peer connections or app-specific infrastructure.

Global-scale anchor storage and discovery: cloud solutions can more effectively manage global-scale AR content creation, discovery, and retrieval.

Improved anchor recall and precision: cloud processing allows use of more compute and data intensive algorithms that leverage usage data to improve performance. Engineers can also innovate more quickly on cloud-backed algorithms and deploy to end-users without waiting for application updates.

Cross-platform: implementation can be done once and distributes to different mobile devices with a smaller on-device footprint.

Universal AR viewing: with a shared index and standardized content formats, it is possible for a single AR browsing app to render content from multiple sources.

With reference now to the Figures, example embodiments of the present disclosure will be discussed in further detail.

Example Computing System Configurations

Figure 1A:
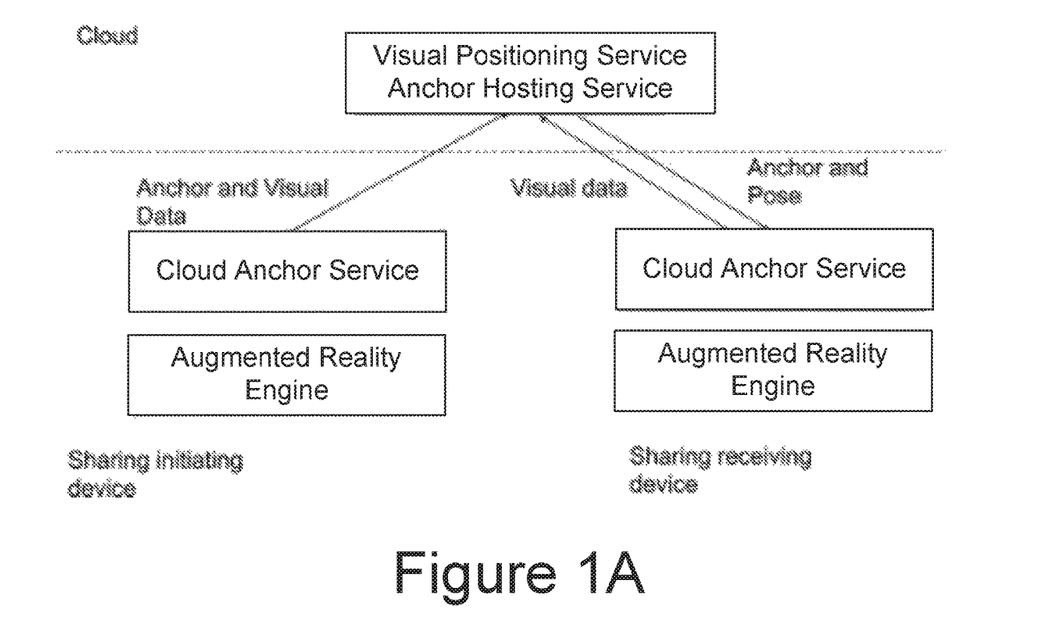
FIGS. 1A-D depict example computing system configurations according to example embodiments of the present disclosure.

FIGS. 1A-D depict example computing system configurations according to example embodiments of the present disclosure. In particular, FIG. 1A depicts an example system in which anchor information and visual data for scene recognition are sent to a server for relay and processing. The "receiving device" then sends sensor information to the server, and the server performs matching of the data from the receiving device to the data of the "hosting device." For example, performing matching can include performing various visual feature matching algorithms designed for localization and/or coordinate alignment. On successful match, anchor and device pose are returned to the "receiving device" from the server.

Figure 1B:
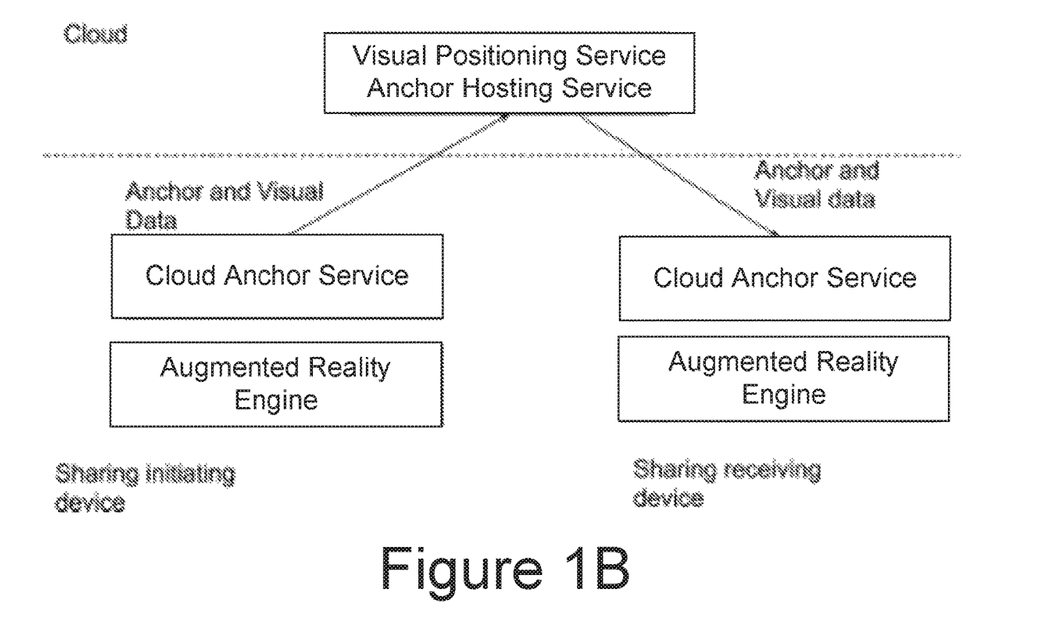

FIG. 1B depicts another example system in which anchor information and visual data for scene recognition are sent to a server for relay and processing before being passed on to a second device. The recognition of the pose of the "receiving device" is computed on the receiving device for which the server sends the sensor information from the "hosting device" to the receiving device. Thus, in comparison to FIG. 1A, in which the visual matching is performed at the server device, in FIG. 1B the visual matching is performed at the receiving device.

Figure 1C:
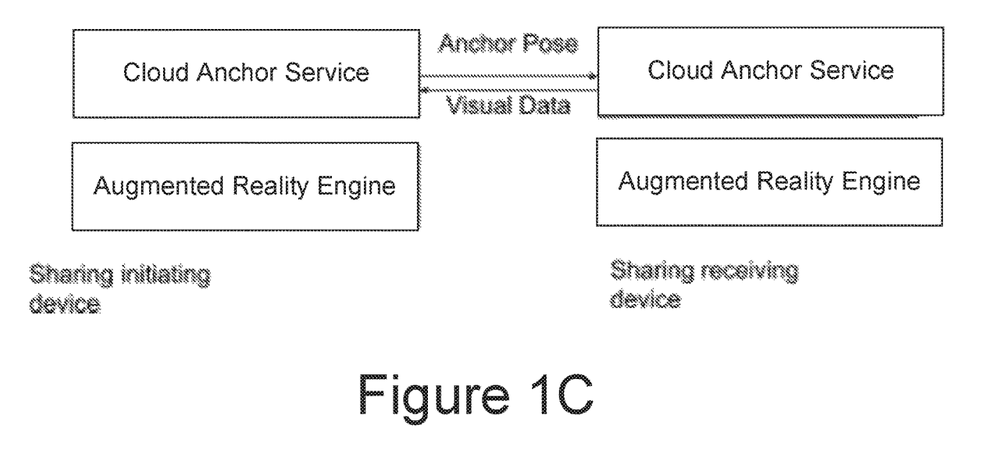

FIG. 1C depicts another example system in which anchor information and visual data for scene recognition are directly passed between devices without involving a server. The "receiving device" sends its visual data to the "hosting device" which returns the relative pose of both devices and the pose of the anchor. Thus, in FIG. 1C, the visual matching is performed at the hosting device.

Figure 1D:
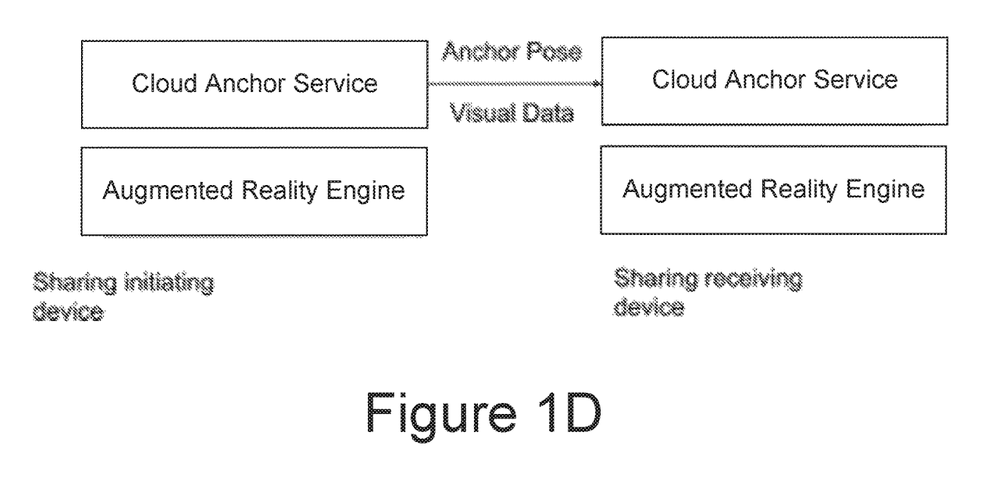

FIG. 1D depicts another example system in which anchor information and visual data for scene recognition are directly passed between devices without involving a server. The "hosting device" sends its visual data and anchor pose to the "receiving device" which performs recognition itself. Thus, in FIG. 1D, the visual matching is performed at the hosting device.

Example Workflow

Figure 2:
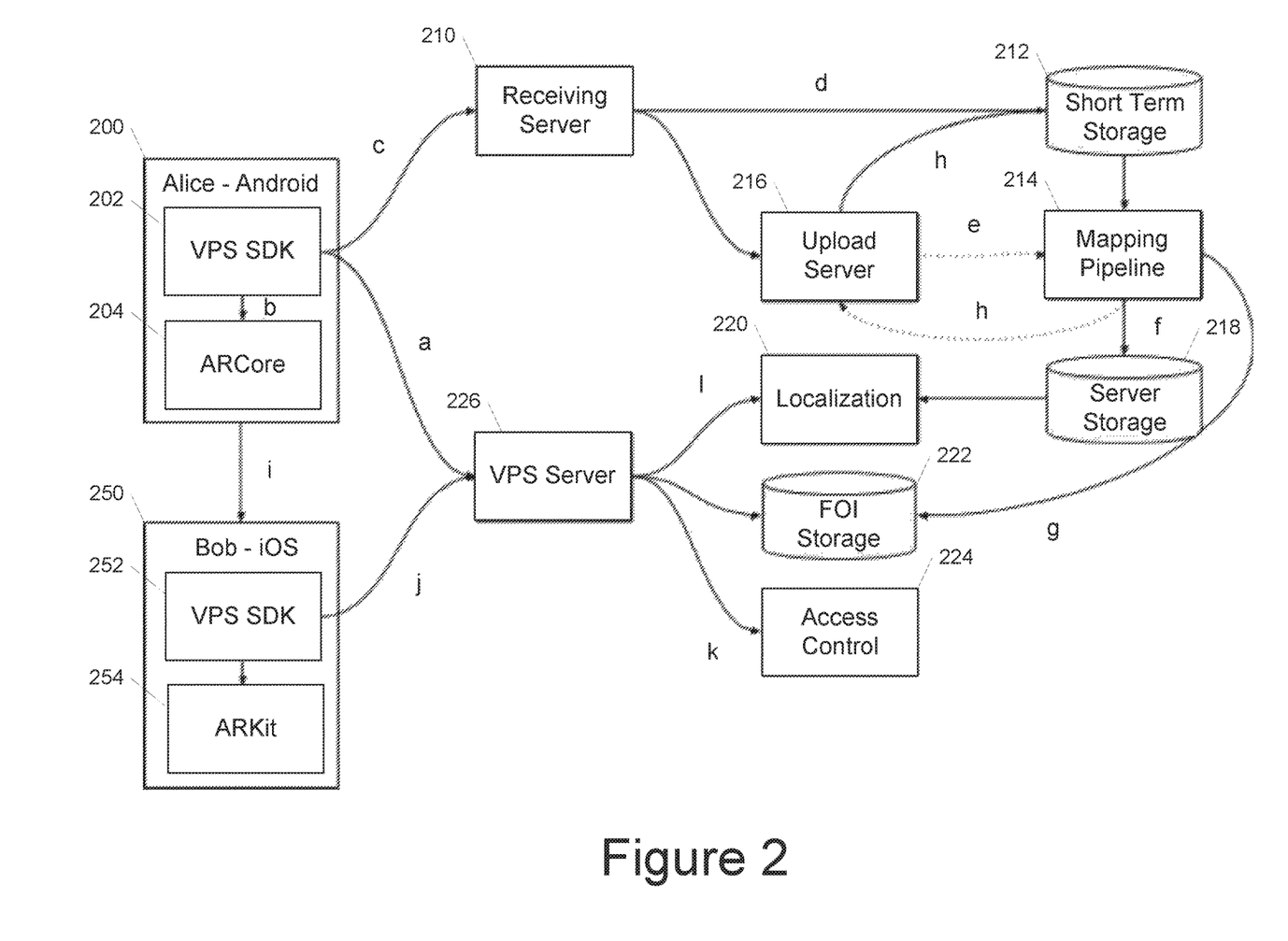
FIG. 2 depicts a block diagram of an example workflow for augmented reality systems according to example embodiments of the present disclosure.

FIG. 2 depicts a block diagram of an example workflow for augmented reality systems. The illustrated workflow can be implemented, at least in part (e.g., except for the illustrated devices 200 and 250), by a visual processing system implemented by a server computing system. The illustrated workflow is provided as one example only. Other workflows can be used as well.

First, Alice starts an application on her Android device 200. Next, ARCore 204 of device 200 starts running motion-tracking.

Next, Alice places and shares AR content. ARCore 204 is called to create an anchor. An Anchor Hosting SDK 202 is called to share the anchor. The VPS SDK 202 calls createAnchor( ) to the VPS Server 226 to create a cloud anchor (a). The VPS SDK 202 extracts the sensor information and creates dataset (b). The VPS SDK 202 uploads the Dataset to a Receiving Server 210 (*c*).

The Dataset is stored in encrypted, short-term storage 212 (*d*). An Upload Server 216 sends notification to a hotspot processor 214 (*e*). The hotspot processor 214 receives the dataset_uploaded notification and starts optimizing the ADF from storage 212 and saves the resulting map at server storage 218 for serving (f).

The hotspot processor 214 updates localization information associated with the anchor at FIO storage 222 (*g*). The hotspot processor 214 sends dataset_processed notification and the upload server 216 responds to the dataset_processed notification by cleaning up the dataset from the short term storage 212 (*h*).

Next, Alice shares the anchor_id to Bob's iOS device 250 (*i*). This step could occur much earlier as well (e.g., after (a)).

Device 250 starts an application on his iOS device. ARKit 254 motion tracking starts against local ARKit coordinate frame.

Device 250 retrieves the AR content shared by Alice. In particular, an Anchor (VPS) SDK 252 calls resolveAnchorPose( ) with anchor_id, camera_features, sos_t_imu, and imu_t_camera (j). The VPS Server 226 checks access control 224 (*k*). Assuming device 250 has access to the content, the VPS Server 226 fetches adf_t_anchor from the anchor and calls Localize( ) to a cloud localization service 220, which uses a Tile from (f) to localize. The VPS Server 226 returns camera_t_anchor to anchor (VPS) SDK 252 (*l*). The VPS SDK 252 calls ARKit 254 to create an ARAnchor for ARKit tracking.

Example Computing System

Figure 3:
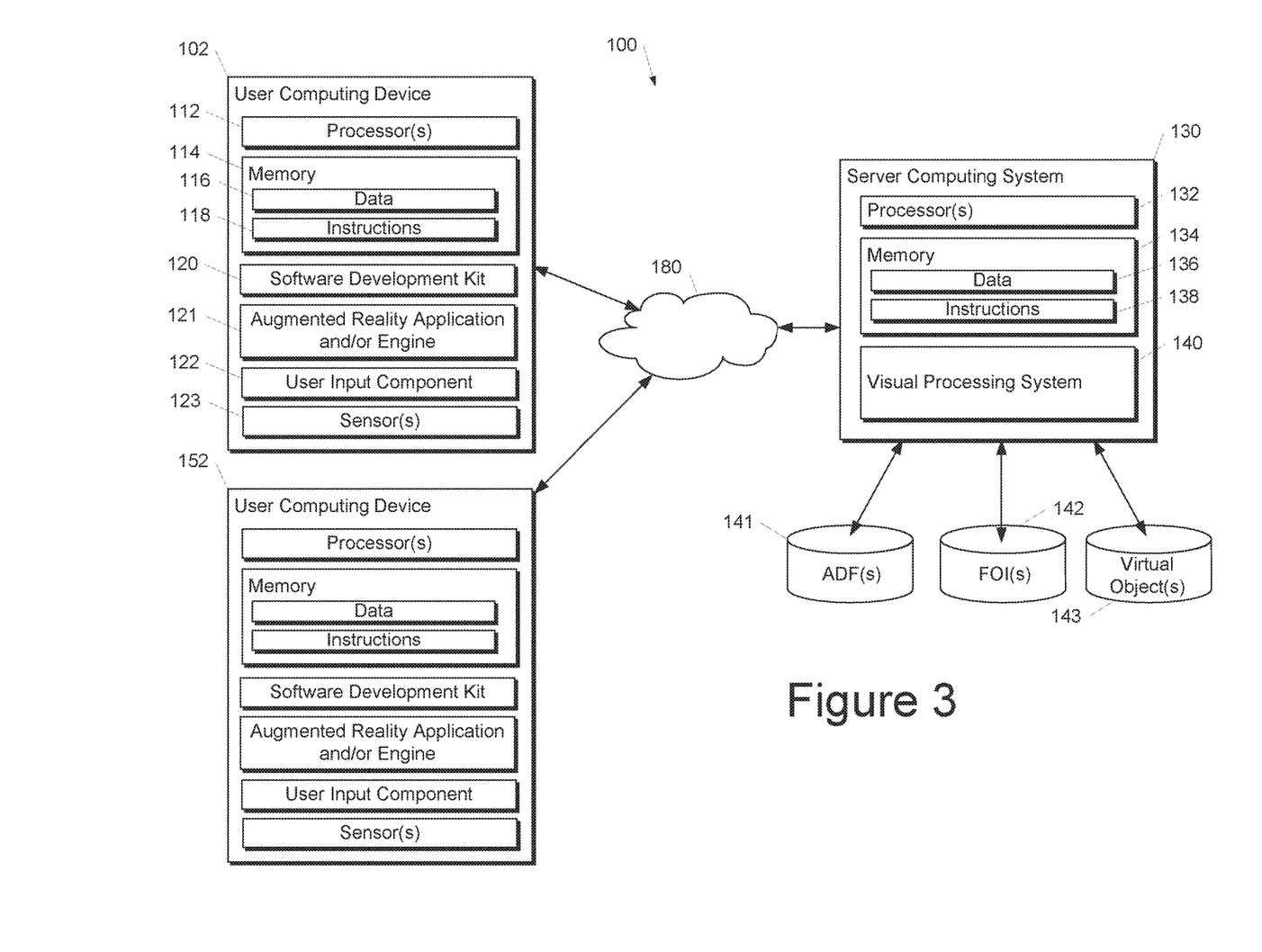
FIG. 3 depicts a block diagram of an example computing system according to example embodiments of the present disclosure

FIG. 3 depicts a block diagram of an example computing system 100 according to example embodiments of the present disclosure. The system 100 includes a user computing device 102, a user computing device 152, and a server computing system 130 that are communicatively coupled over a network 180. For example, communications between the user computing device 102, the user computing device 152, and the server computing system 130 can be accomplished through use of an application programming interface.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can include a software development kit (SDK) 120. The SDK can include computer-executable instructions that, when executed by the processor(s) 112 enable the user computing device 102 to share and receive anchor poses for three-dimensional objects. The user computing device 102 can also include an augmented reality application or engine 121. For example, the augmented reality application or engine 121 can include computer-executable instructions that, when executed by the processor(s) 112 enable the user computing device 102 to render augmented reality content (e.g., virtual objects) on a display of the user computing device 102.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 can also include one or sensors 123 such as cameras, accelerometers, gyroscopes, radar, lidar, and/or types of sensors. The sensors 123 can collect information (e.g., visual information) that describes a surrounding environment of the user computing device 102.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can include a visual processing system 140. The visual processing system 140 can include computer-executable instructions that, when executed, cause the server computing system to receive, store, index, and serve pose and environmental information associated with virtual anchors. For example, the visual processing system 140 can implemented, at least in part (e.g., except for the illustrated devices 200 and 250), the workflow illustrated in FIG. 2.

The visual processing system 140 can be in communication with one or more databases, such as: database 141 that stores one or more Area Description Files (ADFs) or other types of environmental mappings; database 142 that stores one or more Frames of Interest (FOIs) or other types of anchor pose data; and/or database 143 that stores data usable to render one or more virtual objects. The databases can be singular or distributed. The virtual objects can be two-dimensional, three-dimensional, stationary, dynamic in location/shape, mesh objects, and/or other types of virtual objects.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3 illustrates one example computing system that can be used to implement the present disclosure. Other computing systems can be used as well.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

A computing device can refer to any type of computing device including for example, smartphones, laptops, desktops, server computing devices, embedded computing devices, gaming consoles, smart devices, and/or the like. A computing device typically includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the computing device to perform operations. Functional aspects of a computing device can be implemented in software, hardware, firmware, or combinations thereof.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A server computing system comprising one or more server computing devices configured to perform operations, the operations comprising:

receiving, from a first computing device, data descriptive of a surrounding environment of the first computing device and data descriptive of a pose of an anchor placed within the surrounding environment of the first computing device by a user of the first computing device, wherein a virtual object is associated with the anchor;

storing the data descriptive of the pose of the anchor in a data storage device;

receiving a request for the pose of the anchor from a second computing device;

providing, to the second computing device, data descriptive of the pose of the anchor; and deleting the anchor after expiration of a predefined period of time, wherein the predefined period of time is based on a characteristic of sensor data captured of the surrounding environment.

2. The server computing system of claim 1, wherein the one or more server computing devices receive and provide data to and from the first and the second computing devices via one or more pre-defined application programming interfaces.

3. The server computing system of claim 1, wherein the one or more server computing devices receive and provide the data to respective software development kits implemented by the first and the second computing devices.

4. The server computing system of claim 1, wherein:

the data descriptive of the surrounding environment of the first computing device received by the server computing system from the first computing device comprises data that describes one or more visual features of the surrounding environment of the first computing device; and providing, to the second computing device, the data descriptive of the pose of the anchor comprises providing, to the second computing device, data descriptive of the pose of the anchor relative to the one or more visual features of the surrounding environment.

5. The server computing system of claim 1, wherein storing the data descriptive of the pose of the anchor in a data storage device comprises generating and storing a Frame of Interest for the anchor.

6. The server computing system of claim 5, wherein the Frame of Interest references an access location at which data that enables rendering of the virtual object is accessible.

7. The server computing system of claim 6, wherein the operations further comprise merging the Area Description File with one or more other Area Description Files that describe overlapping environments.

8. The server computing system of claim 1, wherein storing the data descriptive of the pose of the anchor in a data storage device comprises indexing the anchor based on a position of the anchor.

9. The server computing system of claim 1, wherein the operations further comprise generating and storing an Area Description File based on the data descriptive of the surrounding environment of the first computing device.

10. The server computing system of claim 1, wherein the operations further comprise:

receiving an approximate location associated with the second computing device; and identifying a number of anchors that are proximately located to the second computing device.

11. The server computing system of claim 1, wherein the operations further comprise:

maintaining an access control list for the anchor; and ensuring, based on the access control list, that the second has permission to access the anchor prior to providing, to the second computing device, the data descriptive of the pose of the anchor.

12. One or more non-transitory computer-readable media that store instructions that, when executed by one or more processors, cause the one or more processors to perform operations, the operations comprising:

receiving, from a server computing system via an application programming interface, data descriptive of a pose of an anchor of a virtual object within a surrounding environment of the computing device;

collecting sensor data descriptive of the surrounding environment of the computing device;

transmitting, to the server computing system via the application programming interface, the sensor data descriptive of the surrounding environment of the computing device;

receiving, from the server computing system via the application programming interface, a localization of the computing device relative to the pose of the anchor based on the sensor data; and rendering, on a display of the computing device, the virtual object within the surrounding environment of the computing device according to the pose of the anchor.

13. The one or more non-transitory computer-readable media 12, wherein the operations further comprise:

receiving, from the server computing system via the application programming interface, an Area Description File descriptive of the surrounding environment of the computing device; and localizing the computing device relative to the pose of the anchor based on the sensor data and the Area Description File.

14. The one or more non-transitory computer-readable media of claim 12, wherein the computing device performs the operations by implementing a software development kit included in an application.

15. A server computing system comprising one or more server computing devices configured to perform operations, the operations comprising:

receiving, from a first computing device, data descriptive of a surrounding environment of the first computing device and data descriptive of a pose of an anchor placed within the surrounding environment of the first computing device by a user of the first computing device, wherein a virtual object is associated with the anchor, and wherein the data descriptive of the surrounding environment of the first computing device received by the server computing system from the first computing device comprises data that describes one or more first visual features of the surrounding environment of the first computing device;

storing the data descriptive of the pose of the anchor in a data storage device;

receiving a request for the pose of the anchor from a second computing device;

receiving, from the second computing device, data descriptive of one or more second visual features of a second surrounding environment of the second computing device;

matching the one or more first visual features to the one or more second visual features to determine a second pose of the second computing device relative to the surrounding environment of the first computing device; and providing, to the second computing device, data descriptive of the pose of the anchor, wherein providing, to the second computing device, the data descriptive of the pose of the anchor comprises providing, to the second computing device, data descriptive of the pose of the anchor relative to the second pose of the second computing device.

16. A server computing system comprising one or more server computing devices configured to perform operations, the operations comprising:

receiving, from a first computing device, data descriptive of a surrounding environment of the first computing device and data descriptive of a pose of an anchor placed within the surrounding environment of the first computing device by a user of the first computing device, wherein a virtual object is associated with the anchor;

storing the data descriptive of the pose of the anchor in a data storage device;

receiving a request for the pose of the anchor from a second computing device; and providing, to the second computing device; data descriptive of the pose of the anchor, wherein providing, to the second computing device, the data descriptive of the pose of the anchor relative to a pose of the second computing device comprises:

localizing the second computing device relative to the surrounding environment of the first computing device; and providing, to the second computing device, data descriptive of the pose of the anchor relative to a localized location of the second computing device.

17. The server computing system of claim 16, wherein storing the data descriptive of the pose of the anchor in a data storage device comprises generating and storing a Frame of Interest for the anchor.

18. The server computing system of claim 17, wherein the Frame of Interest references an access location at which data that enables rendering of the virtual object is accessible.

19. The server computing system of claim 17, wherein the operations further comprise generating and storing an Area Description File based on the data descriptive of the surrounding environment of the first computing device.

20. The server computing system of claim 16, wherein storing the data descriptive of the pose of the anchor in a data storage device comprises indexing the anchor based on a position of the anchor.

* * * * *